(12) United States Patent
Petritz et al.

(10) Patent No.: US 8,236,720 B2
(45) Date of Patent: Aug. 7, 2012

(54) UNSHAPED REFRACTORY MATERIAL, A PROCESS FOR PRODUCING AN EARTH-MOIST, UNSHAPED REFRACTORY MATERIAL, AND USE OF THE UNSHAPED REFRACTORY MATERIAL

(75) Inventors: Bernd Petritz, Veitsch (AT); Alfons Lüftenegger, Munster, IN (US)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 126 days.

(21) Appl. No.: 12/666,033

(22) PCT Filed: Jul. 1, 2008

(86) PCT No.: PCT/EP2008/006396
§ 371 (c)(1),
(2), (4) Date: Dec. 22, 2009

(87) PCT Pub. No.: WO2009/010311
PCT Pub. Date: Jan. 22, 2009

(65) Prior Publication Data
US 2010/0184584 A1 Jul. 22, 2010

(30) Foreign Application Priority Data
Jul. 14, 2007 (DE) .......................... 10 2007 032 892

(51) Int. Cl.
*C04B 35/04* (2006.01)
(52) U.S. Cl. ........ 501/109; 501/108; 501/111; 106/690; 106/691; 106/801; 106/817
(58) Field of Classification Search .......... 501/108–122; 106/690, 691, 801, 817
See application file for complete search history.

(56) References Cited

U.S. PATENT DOCUMENTS

| | | | |
|---|---|---|---|
| 3,916,047 A | 10/1975 | Niesen | |
| 4,298,391 A | 11/1981 | Hayase et al. | |
| 4,385,656 A | 5/1983 | Takahashi et al. | |
| 4,806,259 A * | 2/1989 | Amjad | 510/162 |
| 5,302,563 A * | 4/1994 | Rumpeltin et al. | 501/111 |
| 5,507,474 A | 4/1996 | Dody et al. | |
| 5,954,872 A * | 9/1999 | Benson | 106/691 |
| 6,313,056 B1 * | 11/2001 | Li et al. | 501/101 |
| 6,548,435 B1 * | 4/2003 | Bugajski | 501/109 |
| 7,078,360 B2 * | 7/2006 | Gist et al. | 501/109 |
| 2002/0009622 A1 | 1/2002 | Goodson | |
| 2002/0147125 A1 * | 10/2002 | Hoflinger et al. | 510/447 |
| 2003/0092554 A1 | 5/2003 | Wagh et al. | |
| 2006/0009346 A1 | 1/2006 | Gist et al. | |
| 2006/0165903 A1 * | 7/2006 | Mazzanti | 427/372.2 |
| 2007/0108056 A1 * | 5/2007 | Nyberg et al. | 204/554 |
| 2009/0047425 A1 * | 2/2009 | Colavito et al. | 427/236 |

FOREIGN PATENT DOCUMENTS

| | | |
|---|---|---|
| CA | 1273964 A1 | 9/1990 |
| CA | 2049171 A1 | 2/1992 |
| DE | 11348 C | 11/1880 |
| DE | 2951502 A1 | 6/1980 |
| DE | 3010810 A1 | 11/1980 |
| DE | 3615506 A1 | 11/1987 |
| DE | 3806554 A1 | 11/1989 |
| DE | 69114412 T2 | 2/1997 |
| GB | 2216117 A | 10/1989 |
| JP | 05171059 * | 7/1993 |
| JP | 08188473 * | 7/1996 |
| JP | 2000302561 A | 10/2000 |
| WO | 9414727 A1 | 7/1994 |

OTHER PUBLICATIONS

Definition of sulfamic acid from Wikipedia, Oct. 13, 2011.*

* cited by examiner

*Primary Examiner* — Karl Group
(74) *Attorney, Agent, or Firm* — Christopher L. Parmelee; Walker & Jocke

(57) ABSTRACT

The invention relates to an unshaped refractory material comprising a refractory base component and a binder component, the binder component comprising, related to the refractory material, an acidic component of the group comprising an acid, salt of an acid, ester of an acid, salt and ester of an acid as phosphate, sulfate or carbonate, in an amount of $\geq 1.5$ wt.-% and $\leq 6$ wt.-%, and a basic component of the group comprising: base, urotropin, calcium oxide, calcium hydroxide, magnesium oxide, caustic MgO, sodium hydroxide, potassium hydroxide, magnesium hydroxide, in an amount of $\geq 1$ wt.-% and $\leq 4$ wt.-%, wherein said material receives an earth-moist, crumbly consistency by addition of 1 to 5 wt.-% of water and which solidifies after an exothermic reaction of the binder component.

2 Claims, No Drawings

UNSHAPED REFRACTORY MATERIAL, A PROCESS FOR PRODUCING AN EARTH-MOIST, UNSHAPED REFRACTORY MATERIAL, AND USE OF THE UNSHAPED REFRACTORY MATERIAL

The invention relates to an unshaped refractory material, to a process for producing an earth-moist, unshaped refractory material, and to use of the unshaped refractory material.

Unshaped refractory materials, also known as refractory masses, are made of a mixture comprising a refractory base component and binder.

Unshaped refractory materials are used in particular as building compositions, repair and maintenance compositions and as mortar. Building, repair and maintenance compositions are used in particular for the construction, repair and maintenance of the internal linings of vessels for steel production, for example units for the smelting or treatment of molten steel.

Solidification or hardening of the unshaped refractory materials may proceed in various ways. For example, hydraulic systems are known in which, once water has been added, hydraulic binding leads to setting of the unshaped refractory material. Ceramic binder systems are also known, with which setting proceeds by heat treatment accompanied by sintering. "Cold curing" compositions are also known, in which solidification proceeds by way of chemical or organic binding.

The refractory base component may comprise one or more refractory substances, for example substances based on the system $Al_2O_3$—$SiO_2$ (acidic refractory materials) or based, on basic refractory materials, for example materials based on MgO.

An important field of use for unshaped refractory materials is the use thereof as tundish compositions or tundish wear lining compositions. For this purpose, in particular basic compositions are used, which then form the refractory inner lining of the tundish.

Cold curing compositions are also used for tundish compositions. The advantage of cold curing compositions is in particular that no additional thermal energy has to be applied to initiate binding in the composition. Instead, with these composition types one or more liquid adhesive binders are regularly used, for example water glass, synthetic resin and sulfur- or phenol-containing binders. However, the disadvantage of these binders is that handling both of the binders and of the unshaped refractory material mixed therewith is very complex. The reason for this is in particular also the adhesive properties of the binders, which may result in the machinery in which the binders, and the unshaped refractory material mixed therewith, are processed becoming stuck up by the binders. For this reason, complicated and thus expensive machinery has often to be used, for example expensive mixing machines, which have in addition to be regularly cleaned. In addition, some of these liquid adhesive binders constitute an odour nuisance or are flammable or toxic, such that the machinery for handling the binders or the compositions mixed therewith has to be elaborately enclosed. Also, some of these binders have to be stored under permanently cool conditions, since otherwise undesired curing or solidification of the binder may occur before the binder has been added to the composition. Conversely, it is also sometimes necessary to heat the unshaped refractory material mixed with such liquid adhesive binders in order to initiate the binding reaction of the binders.

The object of the present invention is to provide a cold curing composition, i.e. an unshaped refractory material usable without the use of external thermal energy, which may be used without the use of liquid adhesive binders. In particular, it is intended that no liquid binders should be needed for mixing the unshaped refractory material which constitute an odour nuisance or are toxic or flammable. In addition, the unshaped refractory material is intended to be usable without the use of additional external thermal energy, i.e. to solidify or cure without the use of additional external thermal energy.

This object is achieved by the provision of an unshaped refractory material in the form of a dry mixture with
 a refractory base component and
 a binder component, the binder component comprising an acidic component and a basic component.

The fundamental consideration underlying the present invention is to provide such a binder component in the unshaped refractory material, which binder comprises an acidic component and a basic component. The use of such a binder component is based on the recognition that a binder may be produced from an acidic component and a basic component solely by the addition of water (mixing water), which binder leads to solidification or curing of the unshaped refractory material.

The unshaped refractory material according to the invention therefore requires mixing solely with water, in order to obtain a ready-to-use, plastic unshaped refractory material. The use of liquid adhesive binders is therefore no longer necessary. The above-stated disadvantages, which arise when liquid adhesive binders are used, are thus completely eliminated.

It has emerged that such an excellent binder may be produced from a binder component composed according to the invention in that, in accordance with a preferred embodiment of the invention, the binder component of the material according no the application does not comprise any further component in addition to the acidic component and the basic component (while as yet unmixed with water).

The acidic component is preferably a component which exhibits an acidic action in an aqueous environment or in aqueous solution. The acidic component may for example assume the form of at least one of the following substances: acid, salt of an acid, ester of an acid. Salts or esters of acids may for example be sulfonates, phosphates, sulfates or carbonates.

The unshaped refractory material particularly preferably comprises an acidic component in the form of at least one acid, preferably in the form of at least one weak to moderately weak organic acid, in particular in the form, of a weak organic acid.

For example, an acidic component may be provided in the form of at least one of the following substances: citric acid, amidosulfonic acid, malic acid, tartaric acid, formic acid, acetic acid, oxalic acid, boric acid, sodium bicarbonate, lignin sulfonate, hydrogenphosphate, hydrogensulfate, sodium metaphosphate.

The above-stated acidic components may be used in any desired combination as an acidic component. A preferred combination of acidic components is for example the combination of amidosulfonic acid and boric acid.

The basic component is preferably a component which exhibits a basic action in an aqueous environment or in aqueous solution. The basic component may for example assume the form of at least one of the following substances: base, hydroxide, urotropin (hexamethylenetetramine), calcium oxide, hydrated lime (calcium hydroxide), magnesium oxide, caustic MgO. Hydroxides may for example be sodium hydroxide, potassium hydroxide or magnesium hydroxide.

The above-stated basic components may be used in any desired combination as a basic component.

The above-stated acidic and basic components may be used in any desired combination as a binder component.

For example, the binder component of the unshaped refractory material may comprise one of the following combinations of acidic and basic components:
citric acid and hydrated lime;
citric acid and calcium oxide;
sodium metaphosphate and hydrated lime;
amidosulfonic acid, boric acid and hydrated lime.

Particularly preferably, the unshaped refractory material comprises an acidic component in the form of at least one acid and a basic component in the form of at least one base, which react together in an acid-base reaction only when water is added. In particular, an acidic component in the form of at least one acid and a basic component in the form of at least one base may be provided, which react in an exothermic reaction, in particular an exothermic acid-base reaction, when water is added. The particular advantage of such an exothermic reaction is that, as a result of the accompanying increase in temperature, the time needed for curing of the unshaped refractory material may be reduced markedly relative to the curing time of unshaped refractory materials according to the prior art, in which no exothermic reaction of an acidic and a basic component may be initiated with water.

It has emerged according to the invention that a particularly advantageous course of solidification or particularly favourable curing may be achieved for the material according to the invention in that the above-stated exothermic reaction increases the temperature of the material by at least 5° C., i.e. for example also by at least 8° C. or by at least 10° C. In addition, the temperature of the material may be increased by the exothermic reaction by at most 30° C., i.e. for example also by at most 18° C. As a result of the exothermic reaction, the temperature of the material may accordingly be increased for example by 5 to 30° C., by 3 to 30° C. or for example by 10 to 30° C. In other words, the acidic component and the basic component of the unshaped refractory material are tailored to one another in such a way that they react together once water has been added in such an exothermic reaction, in particular in an acid-base reaction, that the temperature of the material is increased by the above-stated temperature range by this reaction. When this temperature increase takes place, curing of the unshaped refractory material proceeds sufficiently quickly, but not too quickly and also not with a violent reaction of the acidic and basic component with water.

The proportion of acidic component in the unshaped refractory material may preferably be for example $\geq 0.5$ wt. %, thus for example also $\geq 1$ wt. %, $\geq 1.5$ wt. % or $\geq 2$ wt. %. In addition, the proportion of acidic component in the material may preferably be for example $\leq 10$ wt. %, thus for example also $\leq 8$ wt. %, $\leq 6$ wt. % or $\leq 4$ wt. %. The proportion of acidic component in the material may accordingly lie for example in the range from 0.5 to 10 wt. %, 1 to 8 wt. %, 1.5 to 6 wt. % or in the range from 2 to 4 wt. %.

Unless otherwise stated herein, the proportions in wt. % relate in principle to the total weight of the unshaped refractory material (without water).

The proportion of basic component in the material may be for example $\geq 0.5$ wt. %, thus for example also $\geq 1$ wt. % or $\geq 1.5$ wt. %. In addition, the proportion of basic component in the material may be for example $\leq 10$ wt. %, thus for example also $\leq 8$ wt. %, $\leq 6$ wt. %, $\leq 4$ wt. % or $\leq 2$ wt. %. The proportion of basic component in the material may accordingly lie for example in the range from 0.5 to 10 wt. %, 0.5 to 8 wt. %, 0.5 to 6 wt. %, 1 to 4 wt. % or in the range from 1 to 2 wt. %.

The acidic component and the basic component of the binder component are preferably present in the unshaped refractory material in such proportions that they neutralise one another completely once water has been added, thus for example they in particular react together in such a way in an acid-base reaction that, once the reaction is complete, virtually no acidic component and no basic component of the binder component any longer remains in the refractory material, or at most in extremely small residual quantities, for example in proportions of $\leq 1$ wt. %, of $\leq 0.5$ wt. % or of only $\leq 0.1$ wt. %.

Preferably, the acidic component and the basic component of the binder component are readily water-soluble, such that these may dissolve readily in the mixing water and react together completely.

Reaction of the acidic component and the basic component may be improved still further if they assume finely divided form, preferably uniformly distributed in the unshaped refractory material. According to one embodiment, the acidic component and the basic component of the binder component assume finely divided form, preferably with an upper grain limit of 1000 μm or of 500 μm, determined to DIN 52 098.

The acidic component and the basic component accordingly preferably assume a dry or flowable or pourable form in the unshaped refractory material.

In addition, the acidic component and the basic component assume a storage-stable form, in the unshaped refractory material, such that the unshaped refractory material (when not mixed with water) may be simply stored and transported, without the acidic component and the basic component (in the dry state) reacting together or with the refractory base component.

The total proportion of binder component in the unshaped refractory material may be for example $\geq 1$ wt. %, thus for example also $\geq 1.5$ wt. %, $\geq 2$ wt. %, $\geq 2.5$ wt. %, $\geq 3$ wt. % or $\geq 3.5$ wt. %. The maximum quantity of binder component in the material may for example be 20 wt. %, thus for example also $\leq 18$ wt. %, $\leq 16$ wt. %, $\leq 14$ wt. %, $\leq 12$ wt. %, $\leq 10$ wt. %, $\leq 8$ wt. % or $\leq 6$ wt. %. The proportion of binder component in the material may accordingly lie for example in the range from 1 to 20 wt. %, thus for example also in the range from 1.5 to 16 wt. %, 1.5 to 12 wt. % or in the range from 2 to 10 wt. %.

In principle, the refractory base component of the unshaped refractory material may be any desired refractory base component, in particular an inorganic refractory base component.

Preferably, the refractory base component in the unshaped refractory material is a basic refractory base component, preferably an MgO-based refractory base component.

A basic refractory base component may be based for example on at least one of the following substances: magnesia (in particular sintered magnesia), magnesia-spinel, doloma, olivine, limestone.

The proportion of refractory base component in the unshaped refractory material may be for example $\geq 88$ wt. %, thus for example also $\geq 90$ wt. % or $\geq 92$ wt. %. The maximum proportion of refractory base component may be for example $\leq 98.5$ wt. %, thus for example also $\leq 97$ wt. % or $\leq 96$ wt. %. Accordingly, the proportion of refractory base component in the material may accordingly lie for example in the range from 88 to 98.5 wt. %, thus for example also in the range from 90 to 97 wt. % or in the range from 92 to 96 wt. %.

The refractory base component may be present for example in a grain size of $\leq 5$ mm and for example in a grain size of $>0.5$ mm or $>1$ mm. The refractory base component may accordingly be present for example in a grain size of >0 to 5 mm, >0 to 3 mm, >0 to 1 mm, >1 to 5 mm or >1 to 3 mm.

The unshaped refractory material (not mixed with water) preferably assumes pourable form, thus as a flowable or crumbly composition or as a dry mixture.

To produce a ready-to-use, i.e. earth-moist (plastic) composition from the unshaped refractory material according to the invention, the latter is mixed with water. Preferably, such a quantity of water is added to the material that said material takes on an earth-moist, in particular an earth-moist, crumbly consistency. The material may be mixed for example with a quantity of water of $\geq 1$ wt. %, thus for example also with a quantity of $\geq 1.5$ wt. % or of 2 wt. %. The upper limit of the quantity of mixing water may amount for example to $\leq 10$ wt. %, thus for example also to $\leq 8$ wt. %, $\leq 6$ wt. % or $\leq 5$ wt. %. The quantity of mixing water may accordingly lie for example in the range from 1 to 10 wt. %, 1 to 8 wt. % or 1 to 5 wt. %.

A process for producing an earth-moist unshaped refractory material from the unshaped refractory material according to the invention may for example comprise the following successive steps:

producing the unshaped refractory material described herein;

mixing the material with water to produce an earth-moist unshaped refractory material.

As explained above, the unshaped refractory material may be mixed in particular with such a quantity of water that it takes on an earth-moist consistency.

For this purpose, the unshaped refractory material may preferably be mixed with the above-stated quantities of water.

Water may preferably be added to the unshaped refractory material in a mixer, in particular for example in a compulsory mixer or a continuous mixer, or in a spraying machine, for example a pressure sprayer, in which the water is preferably added at the end of the hose.

The unshaped refractory material may preferably be used for template backfilling. Accordingly, the unshaped refractory material mixed with water, i.e. in a plastic (earth-moist) state, may be introduced in a further step behind a template in particular immediately or shortly after mixing. In particular, the unshaped refractory material may be used for template backfilling in a tundish.

The earth-moist unshaped refractory material displays extremely favourable curing behaviour. The earth-moist refractory material accordingly displays such strength, after a relatively short time that it does not have to be held in shape by further auxiliary means, such as for example templates. For example, the earth-moist refractory material may be left to cure for a period of only $\geq 10$ minutes, thus for example also for a period of $\geq 30$ minutes or $\geq 1$ hour. The maximum curing time amounts for example to $\leq 4$ hours, thus for example also to $\leq 3$ hours or $\leq 2$ hours.

The curing time accordingly amounts to for example 10 minutes to 4 hours, thus for example also 30 minutes to 2 hours.

After solidification or curing, any auxiliary means with which the earth-moist refractory material is held in shape may be removed, for example templates may be withdrawn. The cured refractory material is then ready for use.

The unshaped refractory material is also distinguished in particular in that the water may be added thereto at room temperature, i.e. the unshaped refractory material does not have to be heated externally in order, once water has been added to the material, to cause the binder component to perform its binding action. Instead, in the case of the unshaped refractory material according to the invention, an exothermic reaction of the acidic component and the basic component may supply any increased material temperature needed once water has been added.

The unshaped refractory material may in principle be used in any desired manner. Use of the unshaped refractory material as a tundish composition is preferably provided. For instance, the unshaped refractory material may be used as a tundish composition for monolithic structures or for repairs.

The following formulations demonstrate four examples of compositions for unshaped refractory materials according to the invention:

EXAMPLE 1

| Component | Material | Proportion [wt. %] |
| --- | --- | --- |
| Base component | Sintered magnesia | 72 |
| Base component | Olivine | 22 |
| Acidic component | Citric acid | 4 |
| Basic component | Hydrated lime | 2 |

EXAMPLE 2

| Component | Material | Proportion [wt. %] |
| --- | --- | --- |
| Base component | Sintered magnesia | 73 |
| Base component | Olivine | 22 |
| Acidic component | Boric acid | 1 |
| Acidic component | Amidosulfonic acid | 2 |
| Basic component | Hydrated lime | 2 |

EXAMPLE 3

| Component | Material | Proportion [wt. %] |
| --- | --- | --- |
| Base component | Sintered magnesia | 72 |
| Base componwnt | Olivine | 22 |
| Acidic component | Sodium metaphosphate | 4 |
| Basic component | Hydrated lime | 2 |

EXAMPLE 4

| Component | Material | Proportion [wt. %] |
| --- | --- | --- |
| Base component | Sintered magnesia | 72 |
| Base component | Olivine | 24 |
| Acidic component | Sodium metaphosphate | 2 |
| Basic component | Calcium oxide | 2 |

The unshaped refractory material according to the four above-stated formulations was mixed in each case with the addition of 3 wt. % mixing water in a laboratory mixer and the following investigations of the course of setting were performed:

Solidification is determined using an apparatus to DIN-EN 1015-4 (1998) "Test methods for mortar for masonry, Part 4, Determination of consistency of fresh mortar (by plunger penetration)" at 2-minute intervals. The interval of time calculated from the addition of water until a falling weight penetration depth of ≦1 mm is achieved is the solidification time. The increase in temperature caused by the exothermic acid-base reaction was measured by means of a temperature sensor additionally installed in the test specimen mould.

The results achieved with the test mixtures were as follows:
For Example 1:
Temperature increase: 12-26° C.
Solidification time: 8-14 min
For Example 2:
Temperature increase: 8-18° C.
Solidification time: 30-40 min
For Example 3:
Temperature increase: 14-23° C.
Solidification time: 10-16 min
For Example 4:
Temperature increase: 7-15° C.
Solidification time: 18-26 min For testing with regard to application as a tundish composition, the same batches were produced in sufficient quantities and, after mixing with 3 wt. % mixing water, the earth-moist unshaped refractory materials obtained in each case were used for template backfilling in a tundish.

The solidification times determined in this case (calculated from the addition of the mixing water to the earliest time at which it was possible to withdraw the template) and the temperature increase measured in each case were as follows:
For Example 1:
Temperature increase: 15-22° C.
Solidification time: 10-15 min
For Example 2:
Temperature increase: 5-18° C.
Solidification time: 40-50 min
For Example 3:
Temperature increase: 15-25° C.
Solidification time: 10-15 min
For Example 4:
Temperature increase: 10-20° C.
Solidification time: 15-25 min

The invention claimed is:

1. An unshaped refractory material having
   a. a refractory base component and
   b. a binder component, the binder component comprising, related to the refractory material:
      b1. an acidic component in the form of at least one weak to moderately weak organic acid selected from the group comprising: citric acid, malic acid, and tartaric acid, in an amount of ≧1.5 wt.-% and ≦6 wt.-%, and
      b2. a basic component selected from the group comprising: magnesium oxide, caustic MgO, and magnesium hydroxide, in an amount of ≧1 wt.-% and ≦4 wt.-%, and
   c: which receives an earth-moist, crumbly consistency by addition of 1 to 5 wt.-% of water and which hardens after an exothermic reaction of the binder component.

2. A process for producing an earth-moist unshaped refractory material having the following successive steps:
   A. producing a material according to claim 1;
   B. mixing the material with 1 to 5 wt.-% of water to produce an earth-moist unshaped refractory material of crumbly consistency.

\* \* \* \* \*